(12) United States Patent
Depay et al.

(10) Patent No.: US 7,775,486 B2
(45) Date of Patent: Aug. 17, 2010

(54) WEBCAM ASSEMBLY WITH CLAMP AND STAND FORMS

(75) Inventors: Dean Depay, San Jose, CA (US); Andy Logan, Thousand Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 12/245,723

(22) Filed: Oct. 4, 2008

(65) Prior Publication Data

US 2010/0084529 A1 Apr. 8, 2010

(51) Int. Cl.
*E04G 3/00* (2006.01)
*F16L 3/00* (2006.01)
*G03B 17/00* (2006.01)

(52) U.S. Cl. .............. 248/126; 248/121; 248/918; 248/284.1; 348/373; 396/428

(58) Field of Classification Search .......... 248/284.1, 248/126, 149, 150, 176.3, 918, 121, 558; 348/373, 375; 396/428; 362/382, 396
See application file for complete search history.

(56) References Cited

U.S. PATENT DOCUMENTS

| | | | | |
|---|---|---|---|---|
| 1,658,189 A | * | 2/1928 | Embury ................ | 248/160 |
| 5,622,342 A | * | 4/1997 | Mills ..................... | 248/126 |
| 5,855,343 A | * | 1/1999 | Krekelberg ............ | 248/121 |
| 6,349,905 B1 | * | 2/2002 | Mills ..................... | 248/126 |
| 6,431,507 B2 | * | 8/2002 | Prather et al. ......... | 248/166 |
| 6,738,094 B1 | * | 5/2004 | Minami et al. ......... | 348/373 |
| 6,947,093 B2 | * | 9/2005 | Yanakawa et al. ..... | 348/373 |
| 7,017,871 B2 | * | 3/2006 | Chen ..................... | 248/161 |
| 7,066,664 B1 | * | 6/2006 | Sitoh et al. ............ | 396/428 |
| 7,219,866 B2 | | 5/2007 | Depay et al. | |
| 7,431,253 B2 | * | 10/2008 | Yeh ...................... | 248/286.1 |
| 2007/0001071 A1 | | 1/2007 | Yeh | |

* cited by examiner

*Primary Examiner*—Anita M King

(57) ABSTRACT

A webcam assembly includes a webcam head and a support. The support has an arm, a base, and a tail. The arm and tail are pivotably connected to a rear end of the base. The webcam head is connected to the base and the tail through the arm. The support has a clamp form in which the tail has a pivot position away from the base and the arm has a pivot position adjacent to said base. The support also has a stand form in which the tail has a pivot position adjacent to the base and the arm has a pivot position away from the base.

7 Claims, 5 Drawing Sheets

WEBCAM ASSEMBLY WITH CLAMP AND STAND FORMS

BACKGROUND

Webcams, video cameras that can be used to stream video onto the world-wide web, are popular add-ons for computer systems. The top center of the frame of a computer display is often a favorable location for a webcam. Accordingly, many webcams are sold with supports that attach to the top of a display. Such a webcam assembly is disclosed in U.S. Pat. No. 7,219,866 to Depay et al.

Some users desire or require a different location for a webcam, e.g., on a desk surface. Accordingly, some webcams come with different support structures to accommodate different webcam placements. However, the inclusion of the various parts adds to cost and complexity. Also, unused parts are often lost, so a user's desired to change the placement of a webcam can be frustrated.

BRIEF DESCRIPTION OF THE DRAWINGS

The features and advantages of the invention as well as additional features and advantages thereof will be more clearly understood hereinafter as a result of a detailed description of a preferred embodiment of the invention when taken in conjunction with the following drawings in which.

DETAILED DESCRIPTION

The present invention provides a webcam support that can be transformed between a "stand" form and a "clamp" form. In its clamp form, the support can be used to clamp a webcam to a display; in its "stand" form, the support can be used to support the webcam on a horizontal surface and to select an elevation for the webcam. The invention thus provides for alternative webcam placements using a single-piece design so as to avoid the inconvenience and cost associated with separate parts.

Figure 1:
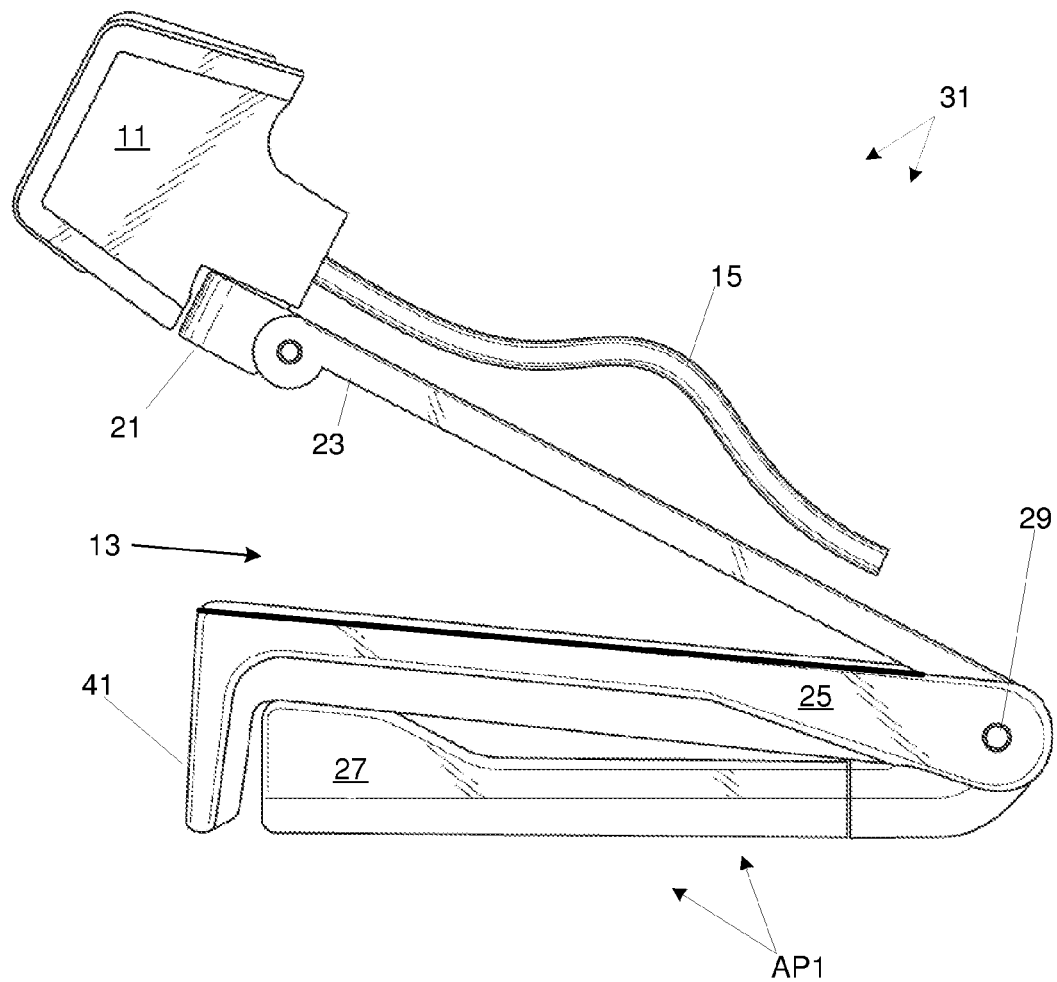
FIG. 1 is a side view of a webcam assembly in a "stand" form in accordance with an embodiment of the invention.

As shown in FIG. 1, a webcam assembly AP1 includes a webcam head 11 and a transformable support 13. Webcam head 11 includes a lens, an imager, processing circuitry, and a USB cable 15 for connecting to a computer. Support 13 includes a neck 21, an arm 23, a base 25, and a tail 27. Webcam head 11 head is pivotably mounted in a neck 21 so that webcam head 11 can be panned to different angles in a horizontal plane. Neck 21 is pivotably connected to arm 23 so that webcam head 11 and neck 21 can be tilted vertically. Arm 23 is pivotably mounted to base 25 so that webcam head 11 can be elevated relative to base 25. Base 25 is pivotably mounted to tail 27 so that base 25 and tail 27 can be pivoted away from each other. Arm 23 and tail 27 pivot relative to base 25 about the same pivot rod 29, which defines a common pivot axis for arm 23, base 25, and tail 27.

Figure 2:
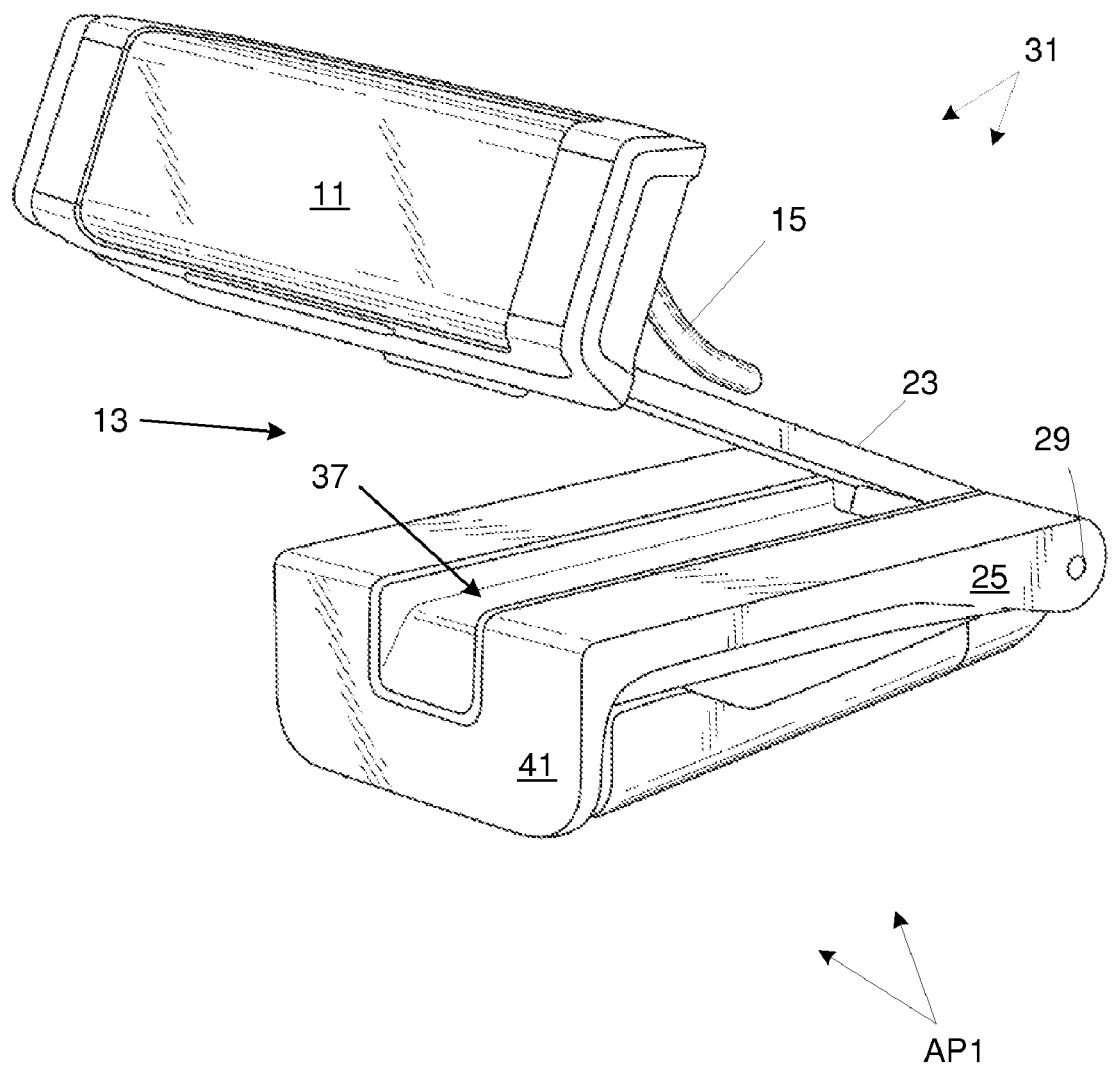
FIG. 2 is a perspective view of the webcam assembly of FIG. 1 in its stand form.
Figure 3:
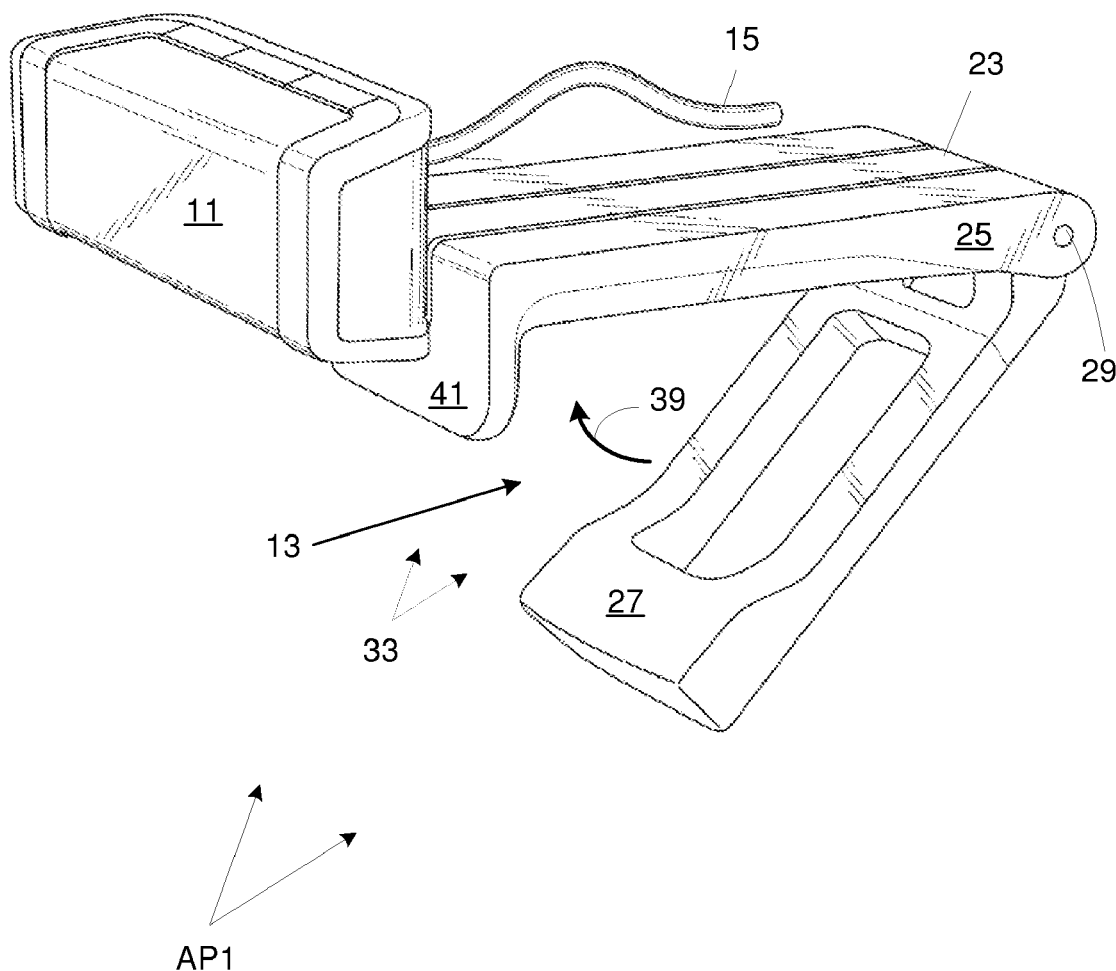
FIG. 3 is a perspective view of the webcam assembly of FIG. 1 in a "clamp" form.
Figure 4:
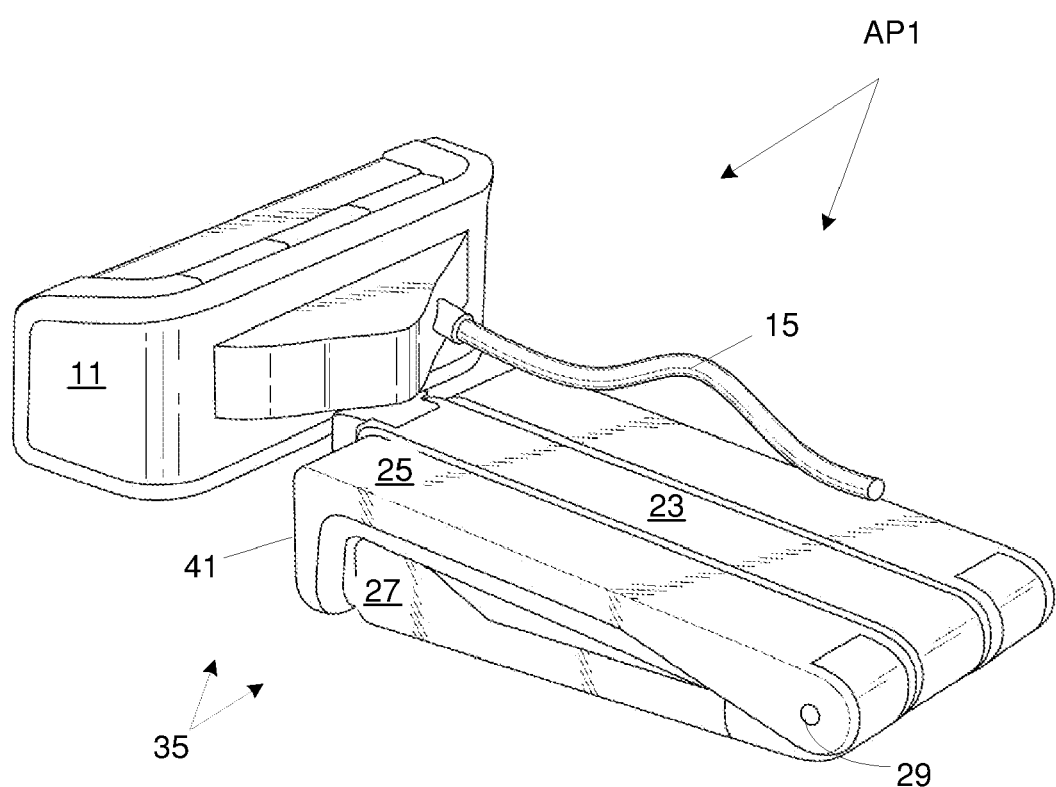
FIG. 4 is a front perspective view of the webcam assembly of FIG. 1 in a "closed" form.
Figure 5:
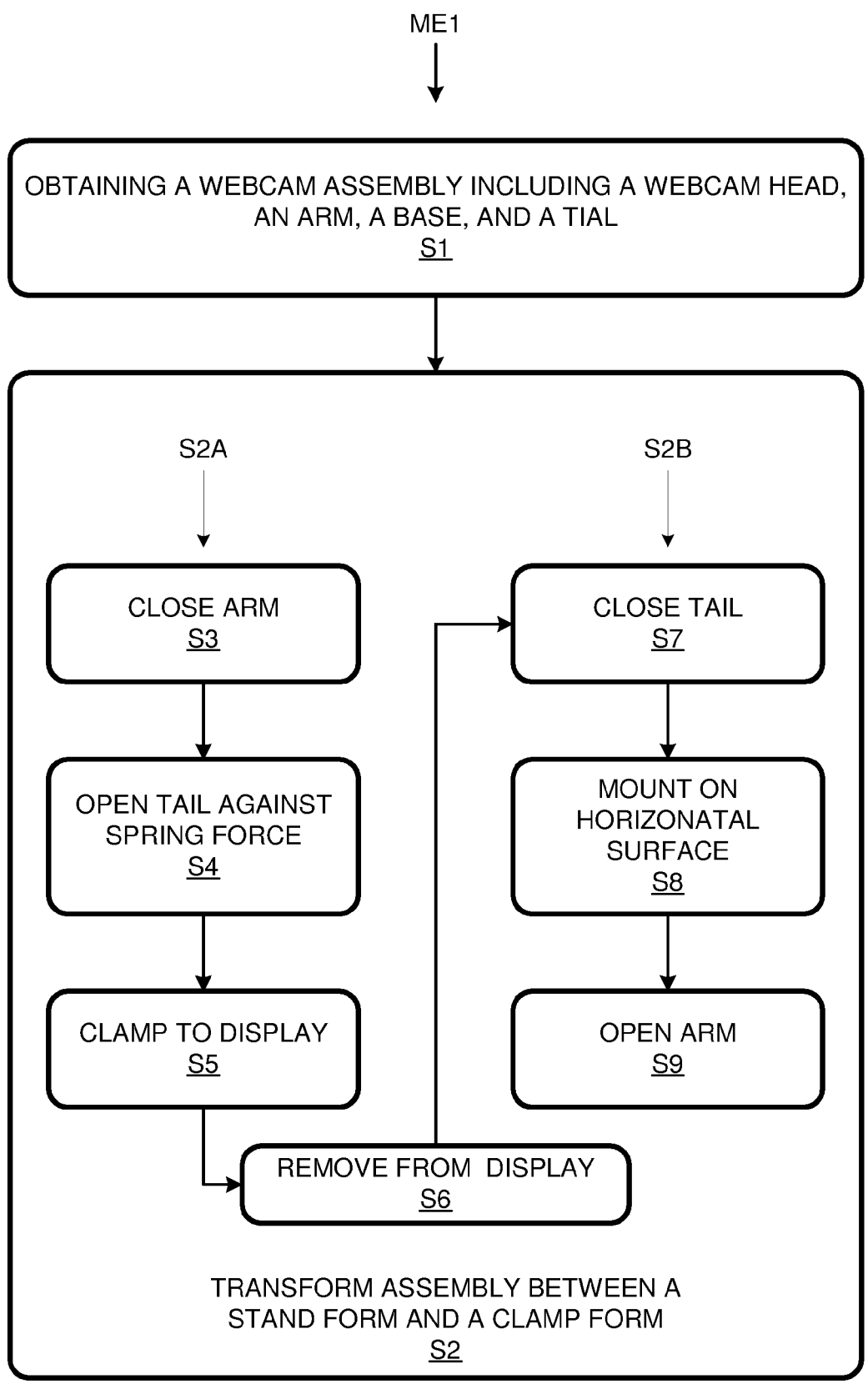
FIG. 5 is a flow chart of a method for mounting the webcam assembly of FIG. 1.

Support 13 (and thus webcam assembly AP1) can assume: 1) a stand form 31, as shown in FIGS. 1 and 2, a clamp form 33, as shown in FIG. 3, and a closed form 35, as shown in FIG. 4. As best understood with respect to FIG. 2, arm 23 is substantially outside of a groove 37 in base 25 when support 13 is in its stand form and arm 23 is in an open pivot position with respect to base 25. When support 13 is in its clamp form 33, as shown in FIG. 3, arm 23 is in a closed pivot position (adjacent base 25) and is disposed substantially within groove 37. Likewise, when support 13 is in its closed form 35, arm 23 is in its closed position and substantially within groove 37.

Tail 27 is in its closed pivot position against base 25 when support 13 is in its stand form 31 (FIGS. 1 and 2) and when support 13 is in its closed form 35 (FIG. 4). When support 13 is in its clamp form 33, FIG. 3, tail is in an open pivot position away from base 25. Movement of tail 27 from its closed position to the open position shown in FIG. 3 is against a spring force 39. This spring force 39 allows base 25 and tail 27 to cooperatively clamp to a display frame or other object as is known in the art.

Arm 23, base, 25, and tail 27 each include a respective pivot end (about pivot rod 29) and a respective distal end. Base 25 has a lip 41 at its distal end. When webcam assembly AP1 is in its stand form 31 (or in its closed form 35), it can be mounted on a horizontal surface with both base 25 (or, more specifically, lip 41) and tail 27 contacting the horizontal surface for stability.

An embodiment of the invention has been commercially available from Hewlett-Packard Company as the HP Elite Webcam Pro since the spring of 2008. This product and all public documentation regarding that product are incorporated herein by reference.

The present invention provides a method ME1 for setting up webcam assembly AP1. Step S1 involves obtaining webcam assembly AP1 including webcam head 11, arm 23, a base 25, and a tail 27. Step S2 involves transforming the webcam between stand form 31 and a clamp form 33.

Step S2 has "to clamp" and "to stand" branches, S2A and S2B, respectively. Branch S2A involves closing arm 23, at substep S3, to a closed pivot position so that it is disposed substantially within groove 37. At substep S4, tail 27 is opened (pivoted away from base 25) against spring force 39. At substep S5, webcam assembly 11 is clamped to a display; in this condition, base 25 and tail 27 grip the display under spring force 39.

If webcam 11 is clamped to a display, branch S2b begins with a substep of removing webcam assembly 11 from the display at substep S6; step S7 then follows. Otherwise, branch S2B begins with closing tail 27 as necessary so that it is in its closed pivot position with respect to base 25 at substep S7. At substep S8, support 13 is mounted on a horizontal surface. In this position, lip 41 of base 25 and tail 27 both touch the horizontal surface to provide a secure support for webcam head 11. At substep S9, arm 23 is opened, i.e., pivoted away from base 25 so as to elevate webcam head 11 to a desired level above base 25.

The foregoing description, for purposes of explanation, has been described with reference to specific embodiments. However, the illustrative discussions are not intended to be exhaustive or to limit the invention to the precise forms disclosed. Many modifications and variations are possible in view of the disclosed teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A webcam assembly comprising:
a webcam head including a camera; and a support having an arm, a base, and a tail, said arm and said tail being pivotably connected to and at a rear end of said base, said head being connected to said base and said tail through said arm, said support having a clamp form in which said tail has a pivot position away from said base and said arm has a pivot position adjacent to said base, said support having a stand form in which said tail has a pivot position adjacent said base and said arm has a pivot position away from said base, said base having a groove, said arm being disposed substantially within said groove when said support is in said clamp form but not when said support is in said stand form.

2. A webcam assembly comprising:

a webcam head including a camera; and a support having an arm, a base, and a tail, said arm and said tail being pivotably connected to and at a rear end of said base, said head being connected to said base and said tail through said arm, said support having a clamp form in which said tail has a pivot position away from said base and said arm has a pivot position adjacent to said base, said support having a stand form in which said tail has a pivot position adjacent said base and said arm has a pivot position away from said base, said tail being urged toward said base by a spring force when said support is in said clamp form.

3. A webcam assembly comprising:

a webcam head including a camera; and a support having an arm, a base, and a tail, said arm and said tail being pivotably connected to and at a rear end of said base, said head being connected to said base and said tail through said arm, said base having a groove, said support having a clamp form in which said tail has a pivot position away from said base and said arm has a pivot position at least partially in said groove, said support having a stand form in which said tail has a pivot position adjacent said base and said arm has a pivot position away from said base, said arm being held in a position substantially out of said groove by friction between said base and said arm.

4. A method comprising transforming a webcam assembly between a stand form and a clamp form by relatively pivoting about a common pivot axis an arm, a base, and a tail of a support structure, wherein said base and tail are connected to a webcam head via said arm, the position of said pivot axis being fixed relative to said base, said webcam assembly being transformed to said clamp form by pivoting said tail relative to said base against a spring force.

5. A method comprising:

transforming a webcam assembly between a stand form and a clamp form by relatively pivoting about a common pivot axis an arm, a base, and a tail of a support structure, wherein said base and tail are connected to a webcam head via said arm, the position of said pivot axis being fixed relative to said base; and using a spring force to clamp to a display device.

6. A method comprising transforming a webcam assembly between a stand form and a clamp form by relatively pivoting about a common pivot axis an arm, a base, and a tail of a support structure, wherein said base and tail are connected to a webcam head via said arm, the position of said pivot axis being fixed relative to said base; and pivoting said arm relative to said base so as to minimize an arm pivot angle relative to said base so that said pivoting said arm results in said arm being disposed predominantly within a groove in said base.

7. A method comprising:

transforming a webcam assembly between a stand form and a clamp form by relatively pivoting about a common pivot axis an arm, a base, and a tail of a support structure, wherein said base and tail are connected to a webcam head via said arm, the position of said pivot axis being fixed relative to said base, wherein said webcam assembly is transformed to said stand form in part by pivoting said tail relative to said base so as to minimize a pivot angle therebetween; and mounting said webcam assembly on a horizontal surface so that said base and said tail contact said horizontal surface.

* * * * *